June 21, 1955  H. SORENSEN  2,711,326
SCOOTER SLED
Filed Feb. 3, 1953
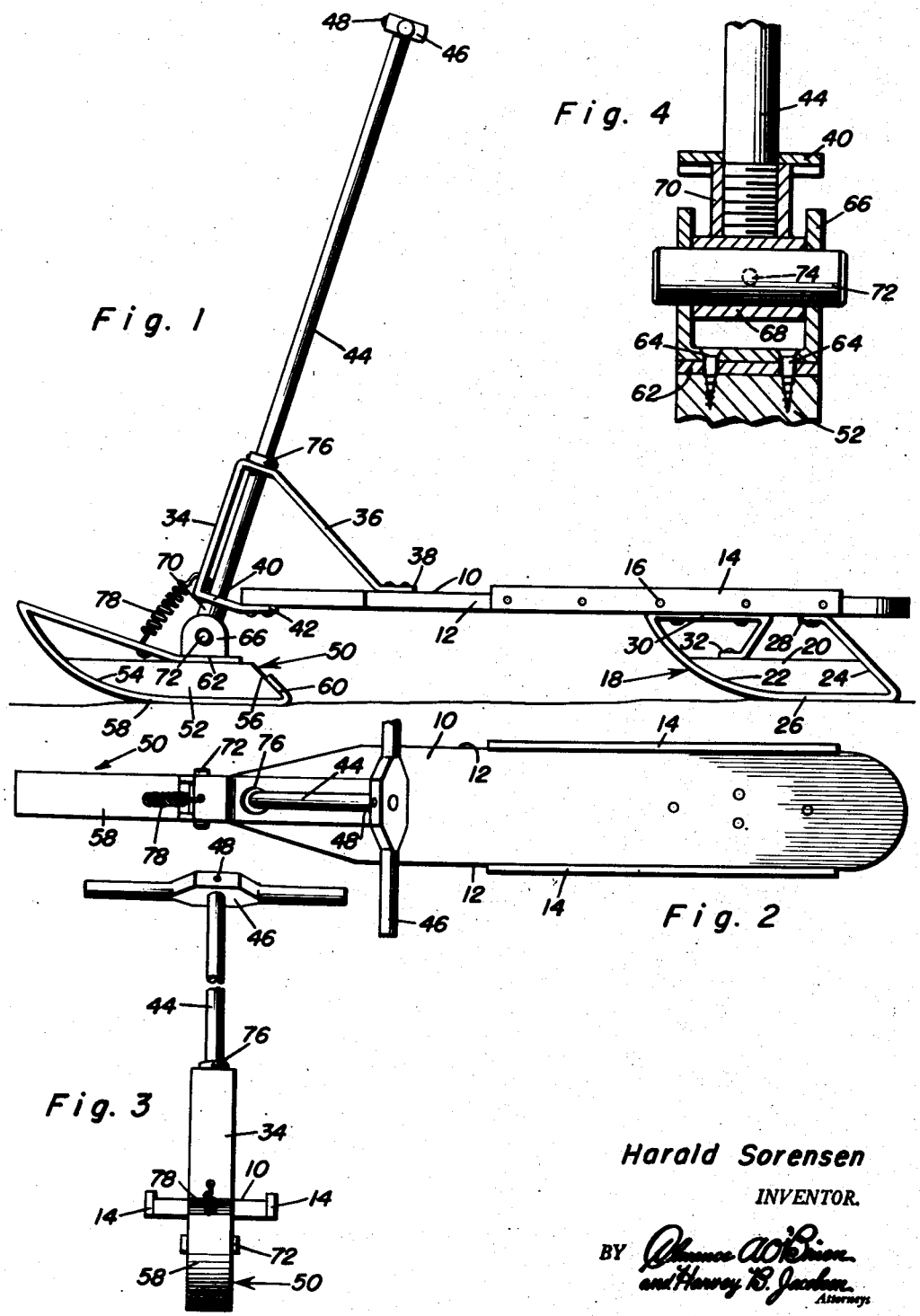
Harald Sorensen
INVENTOR.

United States Patent Office 2,711,326
Patented June 21, 1955

2,711,326

SCOOTER SLED

Harald Sorensen, Amherst, Nova Scotia, Canada

Application February 3, 1953, Serial No. 334,853

1 Claim. (Cl. 280—16)

This invention relates to new and useful improvements in sleighing devices and the primary object of the present invention is to provide a scooter sled including a forward steering runner that may be turned for guiding the sled by a user standing upon the platform portion of the sled.

Another important object of the present invention is to provide a scooter sled including novel and improved mounting means for the forward runner consisting of a spring element that will tend to retain the forward runner longitudinally aligned with the platform portion of the sled.

A further object of the present invention is to provide a scooter sled involving an upwardly and rearwardly extending steering column, a forward steering runner and novel and improved means pivotally attaching the steering column to the forward runner.

A still further aim of the present invention is to provide a scooter sled that is extremely simple and practical in construction, strong and reliable in use, neat and attractive in appearance, small and compact in structure, inexpensive to manufacture and assemble, and otherwise well adapted for the purposes for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the present invention;

Figure 2 is a top plan view of Figure 1;

Figure 3 is a front elevational view of Figure 1; and

Figure 4 is an enlarged detailed vertical sectional view illustrating the manner in which the forward steering runner is operatively connected to the steering column.

Referring now to the drawings in detail, wherein for the purpose of illustration, there is disclosed a preferred embodiment of the present invention, the numeral 10 represents an elongated foot platform having parallel side edges 12 to which retainer strips 14 are secured by fasteners or the like 16. The strips 14 project upwardly beyond the upper flat face of the platform 10 to aid in retaining a user's foot or feet upon the platform.

The rear end of platform 10 is supported for sliding movement by a fixed rear runner 18 having a fibrous support block 20 that is provided with a convexed forward end 22 and a downwardly and rearwardly beveled rear end 24. A runner-forming metallic strap 26 is bent to contact the ends 22, 24 and the flat underside of block 20. The rear end portion of strap 26 contacts end 24 of the block 20 and terminates in an attaching flange 28 that is bolted or suitably fastened to the rear end portion of platform 10.

The forward portion of strap 26 is curved to rest against end 22 of block 20 and is bent rearwardly and downwardly to form a horizontal portion 30 that is bolted or fastened to the platform 10 and an attaching flange 32 that is bolted or fastened to the upper face of block 20.

A U-shaped bearing member 34 is secured to the forward end portion of platform 10. This member is provided with a long downwardly and rearwardly inclined angulated leg or limb 36 terminating in a flange 38 that is fastened or bolted to the upper face of platform 10 and a short rearwardly extending leg or limb 40 terminating in an attaching flange 42 that is bolted or fastened to the undersurface of platform 10 well in advance of flange 38.

A steering column 44 extends through apertures in the limbs 36 and 40 and is supported for rotation by member 34 in an upwardly and rearwardly extending position. The upper end of column 44 extends through an aperture in the central portion of a hand-grip 46. A set screw 48, or the like, carried by hand-grip 46 engages column 44 to retain the hand-grip against sliding or rotation on the column, whereby the column may be rotated by the hand-grip.

The forward end of platform 10 is supported for sliding movement by a forward steering runner 50. Runner 50 is provided with a fibrous support block 52 having a convexed forward end 54 and a downwardly and rearwardly beveled rear end 56. A metallic runner-forming strap 58 is secured to the ends 54, 56 and the flat undersurface of block 52.

The rear upwardly bent end 60 of strap 58 is suitably fixed against end 56 and the forward portion of strap 58 is reversed and bent downwardly and terminates in a flat rear portion 62 that is secured against the flat upper face of block 52 by fasteners 64. Fasteners 64 also extend downwardly through the web of a channel shaped mounting bracket 66 to secure the same against portion 62 as shown in Figure 4.

A combined bearing and coupling is employed for connecting the steering column 44 to the bracket 66 and comprises a sleeve 60 having fixed radially thereon a tube 70. The tube 70 is internally threaded to receivably engage the threaded end of column end 44, whereas sleeve 68 is unthreaded to receive a horizontal pin 72 that extends through registering apertures in the legs of channel bracket 66. A set screw or the like 74 is employed for locking the sleeve 68 to the pin 72.

Limb 40 of bearing member 34 rests on the upper end of the tube 70 and a collar 76, longitudinally adjustably held on column 44, rests upon the upper limb 36 of member 34 to restrict sliding movement of column 44 relative to member 34.

A coil spring 78 connects the bearing member 34 to the strap 58 of runner 50. The spring 78 is provided with terminal hooks that are engaged in apertures in the strap 58 and member 34. Spring 78 is disposed in front of pin 72 to restrict downward movement of the forward end of the runner 50 and to retain the runner 50 aligned with platform 10.

In practical use of the present invention, the scooter sled is pushed along the snow or ice by a user having one foot upon the platform 10 and his hands on the hand-grip 46. After the sled begins to move at the desired speed, the user then places his other foot upon the platform 10. The sled may be readily turned, for steering, by rotating the column 44 to change the position of the runner 50 with respect to the platform 10. Spring 78 tends to retain the forward runner 50 longitudinally aligned with the platform 10 and the spring 78 also tends to prevent downward movement of the forward end of the runner 50 thereby cushioning the forward end of the sled as the same rides over humps in the snow or ice.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A scooter sled comprising: an elongated platform, a fixed runner mounted beneath the rear end portion of said platform, a substantially U-shaped bearing member mounted on the forward end portion of the platform, said bearing member including angulated legs affixed to the platform and having aligned apertures therein, a steering runner supporting the forward end of the platform, said steering runner comprising a longitudinally elongated block and a metallic strap secured therebeneath, said strap terminating in a reversely bent, angulated forward end portion resting on top of the block, a substantially U-shaped bracket mounted on said end portion, said bracket and said end portion having registering openings therein, screws inserted in the openings and securing said end portion and said bracket on the block, a pin journaled in the bracket on the block, a sleeve fixed on said pin between the legs of the bracket, a tube fixed radially on said sleeve, and a steering column threadedly mounted in said tube and journaled in the apertures in the member, said member resting on said tube.

References Cited in the file of this patent
UNITED STATES PATENTS

| | | |
|---|---|---|
| 1,268,229 | Frank | June 4, 1918 |
| 1,500,453 | Heffner | July 8, 1924 |
| 1,535,167 | Lovell | Apr. 28, 1925 |
| 1,560,928 | Wolpert | Nov. 10, 1925 |
| 1,720,071 | Bunce | July 9, 1929 |
| 1,809,295 | Gunderson | June 9, 1931 |